B. H. CARNOVSKY.
EXTENSIBLE TABLE.
APPLICATION FILED AUG. 17, 1910.

986,417.

Patented Mar. 7, 1911.

Witnesses
O. B. Baenziger
Lotta Lee Bray.

Inventor
Byron H. Carnovsky
By Parker & Burton
Attorneys

THE NORRIS PETERS CO., WASHINGTON, D. C.

UNITED STATES PATENT OFFICE.

BYRON H. CARNOVSKY, OF DETROIT, MICHIGAN, ASSIGNOR OF ONE-HALF TO CHARLES SCHULTE, OF DETROIT, MICHIGAN.

EXTENSIBLE TABLE.

986,417. Specification of Letters Patent. Patented Mar. 7, 1911.

Application filed August 17, 1910. Serial No. 577,595.

*To all whom it may concern:*

Be it known that I, BYRON H. CARNOVSKY, a subject of the King of Great Britain, residing at Detroit, county of Wayne, State of Michigan, have invented a certain new and useful Improvement in Extensible Tables, and declare the following to be a full, clear, and exact description of the same, such as will enable others skilled in the art to which it pertains to make and use the same, reference being had to the accompanying drawings, which form a part of this specification.

This invention relates to extension tables; it has for its object a construction and arrangement of the slides employed in an extension table by means of which there is interposed between the sliding parts anti-friction rollers or wheels that enhance ease of moving the one part of the table away from the other part thereof by the use of such slides.

Figure 1:
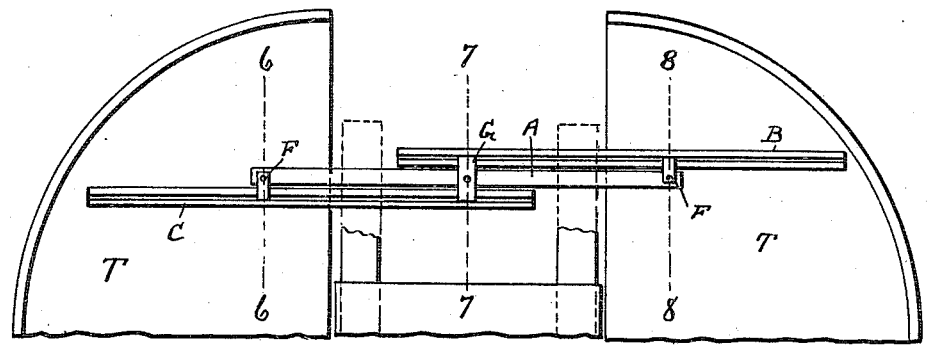
Figure 2:
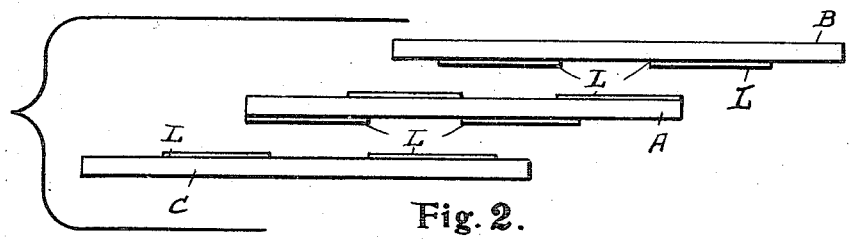
Figure 3:
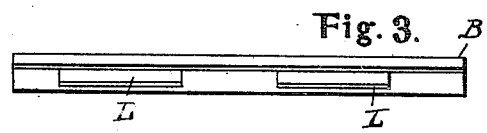
Figure 4:
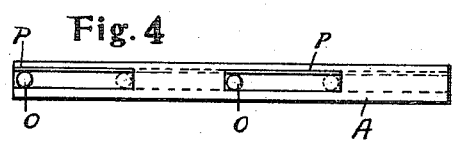
Figure 5:
Figures 6, 7, 8:
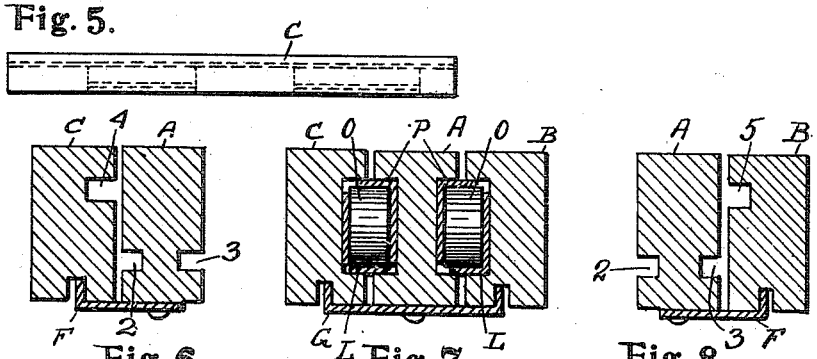

In the drawings:—Figure 1, is an inverted plan view of a half of a table embodying the improvement. Fig. 2, is a diagram indicating the longitudinal movement of the slides with respect to each other. Figs. 3, 4 and 5 are to be taken together, as showing diagrammatically the relation of the slides and the rollers when the table is spread. Fig. 3, is a side elevation of the slide B. Fig. 4, is a side elevation of the slide A. Fig. 5, is a side elevation of the slide C. Fig. 6, is a cross section at the line 6—6 of Fig. 1. Fig. 7, is a cross section at the line 7—7 of Fig. 1. Fig. 8, is a cross section at the line 8—8 of Fig. 1.

In Fig. 7, the two anti-friction rollers are shown, although in the table as spread as shown in Fig. 1, they would probably not be in line to make them both shown in full elevation in a cross section; they might be brought to this position but normally would not assume it.

The central slide A is secured to the pedestal or to a frame resting on a pedestal of a table, and has arranged to it on the one side the slide B which is coupled by a yoke G and a yoke F; the yoke G is a double yoke coupling both the slide B and the slide C to the central member A and consists of a strap of iron with upturned ends adapted to engage in grooves which run lengthwise of the slides B and C. The coupling member F is a strap with one upturned end engaging in the groove of that slide with which it is employed. The slide B is secured to the part T of the table and the slide C is secured to the part $T^1$ of the table, and both slides are held by the coupling members F and G in parallel relation with and slightly spaced from the fixed member A.

In both sides of the fixed member A are made cavities, each of which constitutes one-half of a housing for an anti-friction roller. Each cavity is lined on its upper face (upper with respect to the location of the table) and its adjacent side wall (vertical with respect to the table) and extending longitudinally of the piece with a short piece of angle iron P. The slide A or the slide B, as the case may be, is provided with a similar cavity constituting the remainder of the housing of the anti-friction roller O. This cavity is lined on its vertical face and on its lower face (lower with respect to the table) with a short piece of angle iron L, each angle iron extends beyond the vertical face of the member in which it is inserted and the extending edge engages in a groove in the adjacent member, which groove extends the entire length of the member in which it is formed. The grooves 2 and 3 in the central member A are below the middle line thereof and receive the projecting edges of the angle irons L, the grooves 4 in member C and 5 in the member B are above the middle line thereof and receive the projecting edges of the angle irons P. Preferably, there are in each cavity of the fixed member and the slide members 2, angle irons making two sets of housing for each slide and serving to support both ends of these slides with respect to the middle piece.

The rollers run loose in the housing and consequently the length of the housing in each case need be only one-half or slightly more than half the distance traveled by the slide in extending therein traversing the requisite distance for its work without engaging frictionally against the end of the housing.

What I claim is:—

1. In an extension table, in combination with a plurality of slide members having their opposing faces complementarily grooved, a pair of roller members engaging in each of said grooves, the thickness of said rollers being substantially equal to the combined depth of the opposing grooves wherein they engage, and a pair of bearing plates L shaped in cross section, each lining the bottom and one side of the groove wherein it is located intermediate the rollers and the mass of the slide piece, and extending with its side lining portion across the space between the slide members and slightly into the oppositely located groove along its unlined side wall, thereby almost wholly inclosing said rollers, substantially as described.

2. In an extension table, in combination with a fixed member secured to the supporting frame of the table, slide members located on either side thereof, the opposing faces of said members being longitudinally grooved, coupling members spanning said slide members, whereby they are slidably held in parallel relation to one another, a pair of bearing plates of L shaped cross section lining the faces of each of said grooves, that portion of each lining a lateral wall of its grooves extending beyond the plane of that face of the slide and partially along the unlined wall of the opposite groove, and bearing rollers engaging within the armored chamber thus constituted, their peripheral edges being thereby protected from the abrasive action of the edges of the slide members, substantially as described.

3. In an extension table, the combination of a plurality of laterally grooved slide members, correlating spanner members whereby said slide members are extensibly held in parallel relation to one another, bearing plates lining the bottom and one side of each of said grooves, and extending with their side lining portions across the space intervening between adjacent slide members and partially along the unlined wall of the oppositely located groove, thereby forming a bearing track protected from the abrasive action of the oppositely moving edges of the adjacent slides, and a pair of bearing rollers engaging within the armored chamber thus constituted, substantially as described.

In testimony whereof, I sign this specification in the presence of two witnesses.

BYRON H. CARNOVSKY.

Witnesses:
   STUART C. BARNES,
   WILLIAM M. SWAN.

---

Copies of this patent may be obtained for five cents each, by addressing the "Commissioner of Patents, Washington, D. C."